United States Patent
Savry

(10) Patent No.: US 10,469,267 B2
(45) Date of Patent: Nov. 5, 2019

(54) METHOD OF MANAGING IMPLICIT CERTIFICATES USING A DISTRIBUTED PUBLIC KEYS INFRASTRUCTURE

(71) Applicant: COMMISSARIAT A L'ENERGIE ATOMIQUE ET AUX ENERGIES ALTERNATIVES, Paris (FR)

(72) Inventor: Olivier Savry, Sassenage (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 317 days.

(21) Appl. No.: 15/442,362

(22) Filed: Feb. 24, 2017

(65) Prior Publication Data

US 2017/0250822 A1   Aug. 31, 2017

(30) Foreign Application Priority Data

Feb. 25, 2016 (FR) ...................... 16 51549

(51) Int. Cl.
| | | |
|---|---|---|
| H04L 9/32 | (2006.01) | |
| H01L 29/06 | (2006.01) | |
| H04L 9/08 | (2006.01) | |
| H04L 9/30 | (2006.01) | |

(52) U.S. Cl.
CPC .......... H04L 9/3263 (2013.01); H04L 9/0891 (2013.01); H04L 9/3066 (2013.01); H04L 9/3265 (2013.01); H04L 2209/38 (2013.01)

(58) Field of Classification Search
CPC . H04L 63/08; H04L 63/06; H04L 9/32; G06F 16/90
See application file for complete search history.

(56) References Cited

U.S. PATENT DOCUMENTS

| | | | |
|---|---|---|---|
| 6,792,530 B1 * | 9/2004 | Qu | ........................ H04L 9/0844 380/279 |
| 6,891,503 B1 | 5/2005 | Savry et al. | |
| 7,841,528 B2 | 11/2010 | Savry et al. | |
| 8,022,810 B2 | 9/2011 | Savry et al. | |
| 8,106,845 B2 | 1/2012 | Savry | |
| 8,110,894 B2 | 2/2012 | Savry et al. | |
| 8,141,787 B2 | 3/2012 | Savry | |
| 8,249,502 B2 | 8/2012 | Savry | |
| 8,653,938 B2 | 2/2014 | Savry et al. | |
| 8,699,949 B2 | 4/2014 | Thevenon et al. | |
| 2004/0064693 A1 * | 4/2004 | Pabla | ...................... H04L 63/02 713/168 |

(Continued)

OTHER PUBLICATIONS

U.S. Appl. No. 12/899,852, filed Oct. 7, 2010, 2011/0084796 A1, Olivier Savry.

(Continued)

*Primary Examiner* — Izunna Okeke
(74) *Attorney, Agent, or Firm* — Oblon, McClelland, Maier & Neustadt, L.L.P.

(57) ABSTRACT

A method of managing implicit certificates of an elliptical curve encryption (ECQV). The implicit certificates are stored in different nodes of the network as a function of a distributed hash table (DHT) and not with a single certification authority. The implicit certificate of the public key associated with a node is obtained by chaining elementary certification operations with a sequence of indexing nodes of the network. Chaining of elementary certification operations can reinforce authentication of network nodes.

12 Claims, 3 Drawing Sheets

(56) References Cited

U.S. PATENT DOCUMENTS

| | | | | |
|---|---|---|---|---|
| 2010/0023771 | A1* | 1/2010 | Struik | H04L 9/002 713/171 |
| 2013/0091362 | A1* | 4/2013 | Poeluev | H04L 9/0841 713/179 |
| 2015/0288527 | A1* | 10/2015 | Vanstone | H04L 9/3268 713/156 |

OTHER PUBLICATIONS

U.S. Appl. No. 15/412,252, filed Jan. 23, 2017, Florian Pebay-Peyroula et al.

U.S. Appl. No. 15/440,157, filed Feb. 23, 2017, Olivier Savry et al.

French Preliminary Search Report dated Nov. 7, 2016 in French Application 16 51549 filed on Feb. 25, 2016 (with English Translation of Categories of Cited Documents).

Zhen Luo et al., "A Self-organized Public-Key Certificate System in P2P Network," Journal of Networks, vol. 6, No. 10, Oct. 2011, pp. 7.

Srdjan Capkun et al., "Self-Organized Public-Key Management for Mobile Ad Hoc Networks," IEEE Transactions on Mobile Computing, vol. 2, No. 1, Jan.-Mar. 2003, pp. 13.

Siamak Sarmady et al., "A Survey on Peer-to-Peer and DHT," https://arxiv.org/ftp/arxix/papers/1006/1006.4708.pdf, Jun. 2010, pp. 3.

Savio Sciancalepore et al., "Key Management Protocol with Implicit Certificates for IoT systems," Proceedings of The 2015 Workshop on IOT Challenges in Mobile and Industrial Systems, IOT-SYS '15, Jan. 2015, pp. 6.

Adis Medic, "Survey of Computer Trust and Reputation Models— The Literature Overview," International Journal of Information and Communication Technology Research, vol. 2, No. 3, Mar. 2012, pp. 22.

* cited by examiner

METHOD OF MANAGING IMPLICIT CERTIFICATES USING A DISTRIBUTED PUBLIC KEYS INFRASTRUCTURE

TECHNICAL DOMAIN

The purpose of this invention is related to the domain of cryptography and more particularly public key infrastructures.

STATE OF PRIOR ART

Asymmetric cryptography systems, also called public key systems, traditionally call upon certification authorities with the function of delivering, authenticating and possibly revoking public key certificates. More precisely, a node holding a private key and public key pair making use of an asymmetric cryptosystem (for example such as the RSA cryptosystem), can ask a certification authority to create a certificate for it to link its public key to its identity. Such a certificate is usually obtained by hashing (for example SHA hashing) of information containing the public key and the holder's identifier, the result of hashing or the condensate being signed by the private key of the certification authority. Thus, any third party who would like to make a secure exchange with the node in question and that trusts the Certification Authority (CA) can firstly verify the authenticity of the public key of the node with the CA. In practice, certification authorities are organised hierarchically according to their degree of trust, a public key of one certification authority itself possibly being authenticated with a higher rank certification authority, as far a root certification authority. Remember that public key certificates respect a format standardised by the ITU, called the X.509 format.

However, classical asymmetric cryptosystems such as RSA use large keys (public and private) (2 or 4 kbits) and the associated X.509 certificates are also very high volume (several kilobytes). Consequently they are not suitable for the field of Internet of Things (IoT) in which nodes usually only have small memory and calculation resources. This is why it is preferred to use cryptosystems on Elliptic Curve Qu-Vanstone implicit Certificates (ECQV).

Firstly, it should be remembered that an Elliptic Curve Cryptography (ECC) cryptosystem is defined by a set of parameters called domain parameters, in other words particularly constants involved in the elliptical equation defined on $Z_p$ (in which p is prime), the generating point G and the order n of the cyclic group generated by the generating point. The ECC encryption is based on the discrete logarithm problem. More precisely, a private key c (integer number) is related to the public key Q (point on the elliptical curve E) by cG=Q.

The principle of encryption on an elliptical curve with implicit certificate is summarised below. It is assumed that Alice would like to generate a (private key, public key) pair and to obtain a certificate for her public key from a certification authority CA.

Alice generates an integer number α (that will be used to obtain her secret key) and sends αG to the certification authority CA.

The certification authority CA has a private key c and a corresponding public key cG. It generates an integer number k within the [1,n−1] range and calculates data γ, called the public key reconstruction data, making use of:

$$\gamma = \alpha G + kG \qquad (1)$$

Consequently, the data γ are on the elliptical curve.

The certification authority CA calculates the condensate $e = h(\gamma \| ID_A)$ in which $ID_A$ is an identifier of Alice (for example her IPv6 address), ∥ is a concatenation operation and h(.) is a hash function (such as SHA-1).

The certification authority CA then calculates the private key reconstruction data by:

$$s = ek + c \bmod n \qquad (2)$$

The certification authority sends the private key and public key reconstruction data pair (s, γ) to Alice. Alice can then calculate her private key a and her public key $Q_A$ as follows:

$$\alpha a = e\alpha + s \bmod n \qquad (3\text{-}1)$$

$$Q_A = e\gamma + Q_{CA} \qquad (3\text{-}2)$$

where $Q_{CA}$ is the public key of the certification authority.

It can be seen that a third party, Bob, who would like to make a secure exchange with Alice, can obtain her public key $Q_A$ directly from her implicit certificate γ.

This encryption and certification method is well adapted to the Internet of Things (IoT) because the keys and the implicit certificates are very small (128 or 256 bits)

Nevertheless, the implicit certificates are still managed (creation, storage, revocation) in a central location by a certification authority. The trust in a centralised certification authority can require caution or be doubted, especially in the field of the Internet of things in which their independence is not necessarily guaranteed.

Consequently, the purpose of this invention is to propose a method of managing implicit certificates, particularly in the domain of the Internet of Things, that does not have the disadvantages mentioned above. In particular, the invention aims to disclose a method of managing implicit certificates with a very high degree of security and independent of a single certification authority.

PRESENTATION OF THE INVENTION

This invention is defined by a method of managing implicit certificates of public keys for a communication network, the public keys being related to a cryptosystem on an elliptic curve, each implicit certificate being usable to identify a public key of a node on the network and each node being identified by an identifier, in which:

a first implicit certificate ($\gamma_{A_0}$) of a node A is calculated by and is stored in a first indexing node ($B_0$), the first indexing node being determined by a distributed hash table, starting from an identifier condensate obtained by hashing a first value containing the node identifier A;

a first public key ($Q_{A_0}$) of node A is calculated from the first implicit certificate and the public key of the first indexing node ($Q_{B_0}$);

a second implicit certificate ($\gamma_{A_i}$) of node A is calculated by a second indexing nods ($B_i$), the second indexing node being determined by said distributed hash table from a first certificate condensate ($e_{A_0}$) obtained by hashing a second value containing the first implicit certificate and the node identifier A, said second implicit certificate being transmitted to the first indexing node to be stored in it;

a second public key ($Q_{A_i}$) of node A is calculated from the first public key ($Q_{A_0}$) of node A and the public key of the second indexing node ($Q_{B_i}$);

The identifier condensate is advantageously obtained by $h(ID_A \| keyword)$ where $ID_A$ is the identifier of node A, keyword is a known password of network nodes, ∥ is a concatenation operation and h is a hash function.

According to a first embodiment:

the first public key of nods A is calculated by $Q_{A_0} = e_{A_0} \gamma_{A_0} + Q_{B_0}$ in which $\gamma_{A_0}$ is the first implicit certificate, $e_{A_0}$ is the first certificate condensate and $Q_{B_0}$ is the public key of the first indexing node;

the second public key of node A is calculated by $Q_{A_i} = Q_{A_0} + e_{A_i} \gamma_{A_i} + Q_{B_i}$ in which $\gamma_{A_i}$ is the second implicit certificate of node A, $e_{A_i}$ is a second certificate condensate obtained by hashing a second value, containing the second implicit certificate of the node A, and $Q_{B_i}$ the public key of the second indexing nods.

In a second embodiment of the invention, a plurality of implicit certificates are generated for node A during a plurality of successive iterations, and at iteration i:

an $(i+1)^{th}$ calculates $(B_i)$ calculates $(i+1)^{th}$ implicit certificate $(\gamma_{A_i})$ for node A, the $(i+1)^{th}$ indexing node being determined by the distributed hash table from a $i^{th}$ certificate condensate $(e_{A_{i-1}})$ obtained by hashing a $(i+1)^{th}$ value containing the $i^{th}$ implicit certificate of node A obtained in the previous iteration, and the identifier of node A ($ID_A$), said $(i+1)^{th}$ implicit certificate of node being transmitted to the first indexing node to be stored in it;

an $(i+1)^{th}$ pubic key $(Q_{A_i})$ of node A is calculated from the $i^{th}$ public key $(Q_{A_{i-1}})$ of node A, obtained in the previous iteration, and the public key of the $(i+1)^{th}$ indexing node $(Q_{B_i})$.

The $(i+1)^{th}$ certificate condensate is advantageously obtained by $e_{A_i} = h(\gamma_{A_i} \| ID_A)$ or $e_{A_i} = h(\gamma_{A_i} \| \gamma_{A_{i-1}} \| ID_A)$ in which $\gamma_{A_i}$ and $\gamma_{A_{i-1}}$ are the $(i+1)^{th}$ and $i^{th}$ implicit certificates, $ID_A$ is the node identifier A and ∥ is a concatenation operation and h is a hash function.

Alternatively, the $(i+1)^{th}$ certificate condensate is obtained by $e_{A_i} = h(\gamma_{A_i} \| ID_A \| D_{A_i})$ or $e_{A_i} = h(\gamma_{A_i} \| \gamma_{A_{i-1}} \| ID_A \| D_{A_i})$ in which $\gamma_{A_i}$ and $\gamma_{A_{i-1}}$ are the $(i+1)^{th}$ and $i^{th}$ implicit certificates respectively, $ID_A$ is the node identifier A, $D_{A_i}$ is a validity date associated with the $(i+1)^{th}$ implicit certificate, ∥ is a concatenation operation and h is a hash function.

The $(i+1)^{th}$ public key of node A can be calculated by $Q_{A_i} = Q_{A_{i-1}} + e_{A_i} \gamma_{A_i} + Q_{B_i}$ in which $\gamma_{A_i}$ is the $(i+1)^{th}$ implicit certificate of node A, $e_{A_i}$ is the $(i+1)^{th}$ certificate condensate and $Q_{B_i}$ is the public key of the $(i+1)^{th}$ indexing node;

The interval between two successive iterations may be equal to a predetermined fixed duration.

Alternatively, the $(i+1)^{th}$ implicit certificate $(\gamma_{A_i})$ calculated in iteration i, is associated with a validity date $(D_{A_i})$ and the next iteration is made when this validity date has expired.

Also alternatively, the interval between two successive iterations may be equal to a pseudo-random duration.

In all cases, it would be possible that in the next iteration i, the first indexing node stores a list of implicit certificates $\gamma_{A_j}$, j=0, . . . , i obtained during successive iterations, in relation to the identifier condensate.

Furthermore, in iteration i, the first indexing node can store a list of validity dates $D_{A_j}$, j=0, . . . , i of said implicit certificates and/or a list of trust and reputation ratios T & $R_j$, j=0, . . . , i relation to the identifier condensate, in which T & $R_j$ is the trust and reputation ratio of the $(j+1)^{th}$ indexing node.

BRIEF DESCRIPTION OF THE DRAWINGS

Other characteristics and advantages of the invention will become clear after reading a preferred embodiment of the invention with reference to the appended figures among which.

DETAILED PRESENTATION OF PARTICULAR EMBODIMENTS

In the following, we will consider a plurality of network nodes, for example a 6LoWPAN network in the domain of the Internet of Things connected to the Internet IP through a gateway. However, the man skilled in the art will understand that the invention can be applied to any type of network.

A first concept on which the invention is based is to not store implicit certificates in a single node, for example on a dedicated server, but rather to store them distributed in a plurality of nodes by means of a Distributed Hash Table (DHT).

It should be remembered that a DHT can be used to find the address of a node (of the addresses of several nodes) on which the information (also called value in the context of a DHT) associated with this key is stored. An introduction to DHT techniques is given in the paper by S. Sarmady entitled "A Survey on Peer-to-Peer and DHT", arXiv preprint arXiv: 1006.4708, 2010.

The storage of implicit certificates using the Chord protocol will be described below. However, an expert in the subject will understand that other DHT storage protocols could be used alternatively without going outside the scope of protection of the invention.

Figure 1:
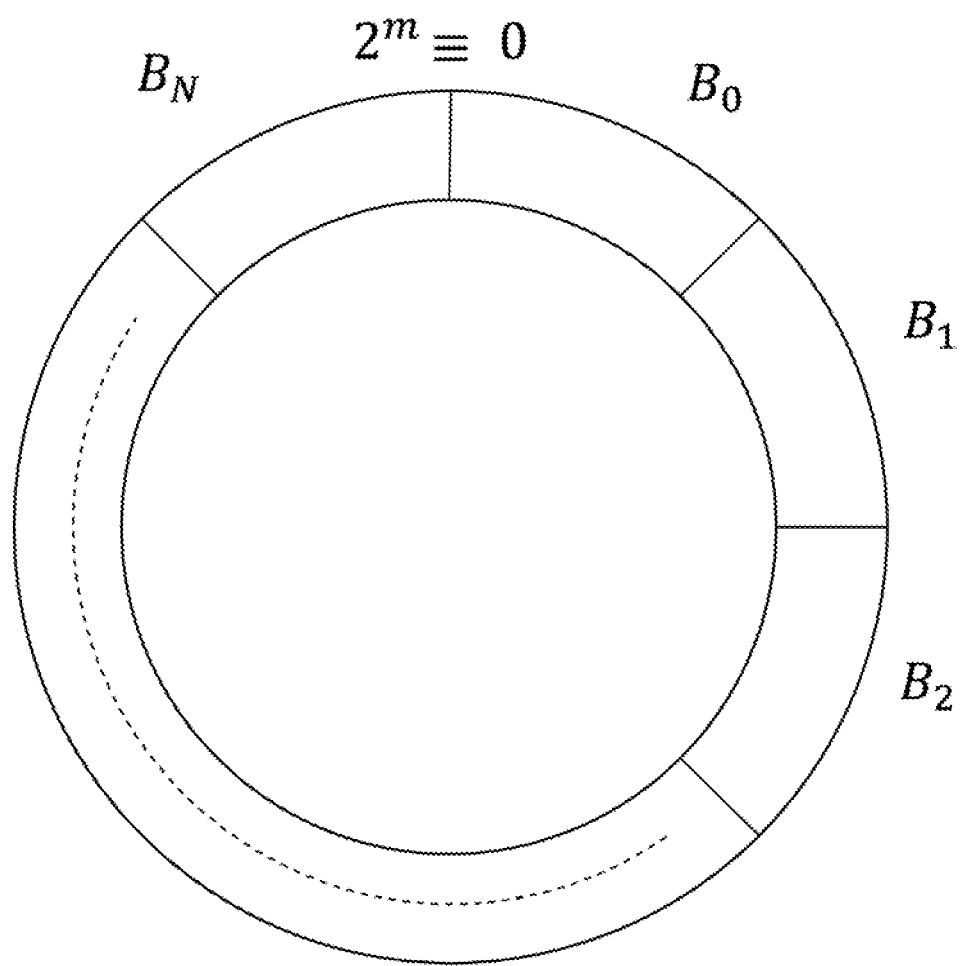
FIG. 1 represents an example distribution of the storage of implicit certificates in different nodes according to a distributed hash table.

As mentioned above, the implicit certificates are generated using a hash function h (for example SHA hashing). If the number of condensate bits is denoted m, the values of function h lie within the interval $[0,2^m-1]$. This interval can be looped back on itself (the value $2^m$ then coinciding with the value 0) and represented in the form of a circle as illustrated in FIG. 1.

According to a first example embodiment, the interval $[0,2^m-1]$ is divided into a plurality of consecutive segments (ring portions in FIG. 1), a representative node being associated with each segment, in other words a node in the network such that its hash value (condensate) is included in the segment concerned. In other words, a node $B_i \in \{B_0, \ldots, B_N\}$ is associated with a segment $[a,b[ \subset [0,2^m-1]$ such that $h(B_i) \in [a,b[$. It is then said that the node $A_i$ manages the segment $[a,b[$ or the points in this segment.

Preferably, according to a second example embodiment, the interval $[0,2^m-1]$ is covered by a plurality of segments, these segments possibly overlapping with a degree of overlap, K, in other words said point in this interval belongs to at least K distinct segments.

The nodes associated with the different segments are called indexing nodes and contain a copy of the DHT table. For each segment, the DHT table gives the indexing node that will manage implicit certificates belonging to the segment.

Thus, in order to recover the implicit certificate of a public key belonging to a node characterised by its identifier ID, for example its IPv6 address, the hash value h(ID)) is calculated and the DHT table is searched for an indexing node $A_i$ responsible for managing a segment containing h(ID)). The implicit certificate can be retrieved from this indexing node.

The indexing nodes could possibly be organised hierarchically, a coarse indexing level being made by first level indexing nodes pointing to indexing nodes on a second level responsible for finer indexing (in other words a finer segmentation). In the domain of the Internet of Things, the root indexing node can be the gateway between the 6LoWPAN network and Internet.

In any case, it will be understood that the second example embodiment has the advantage of providing storage redundancy due to overlapping of segments. Thus, if one of said indexing nodes responsible for the relevant segment leaves the network or stops functioning, the implicit certificate can alternatively be retrieved from the K−1 other nodes.

If required, each segment can be managed by several indexing nodes, a priority level then being assigned to each indexing node. Thus, the first step could be to address a first high priority indexing node managing the segment that contains h(Id) and, if this first indexing node is overloaded, a second lower priority indexing node managing the same segment.

Storage and management of implicit certificates are thus distributed to a plurality of network nodes. These nodes are advantageously chosen from among nodes that have the highest memory capacity.

To prevent an indexing node from being able to allocate a segment of the DHT to itself, a password keyword known to all nodes in the network can advantageously be added to the node identifier, ID, before the hash function is applied to it. More precisely, for a given segment [a,b[, the indexing node of this segment (consequently managing implicit certificates falling in this segment) will then be chosen from among nodes $B_i$ such that $h(ID_{B_i}||keyword) \in [a,b[$.

A second concept on which this invention is based is to chain implicit certificates to reinforce the security of certificates and authentication of the public keys contained in them.

Figure 2:
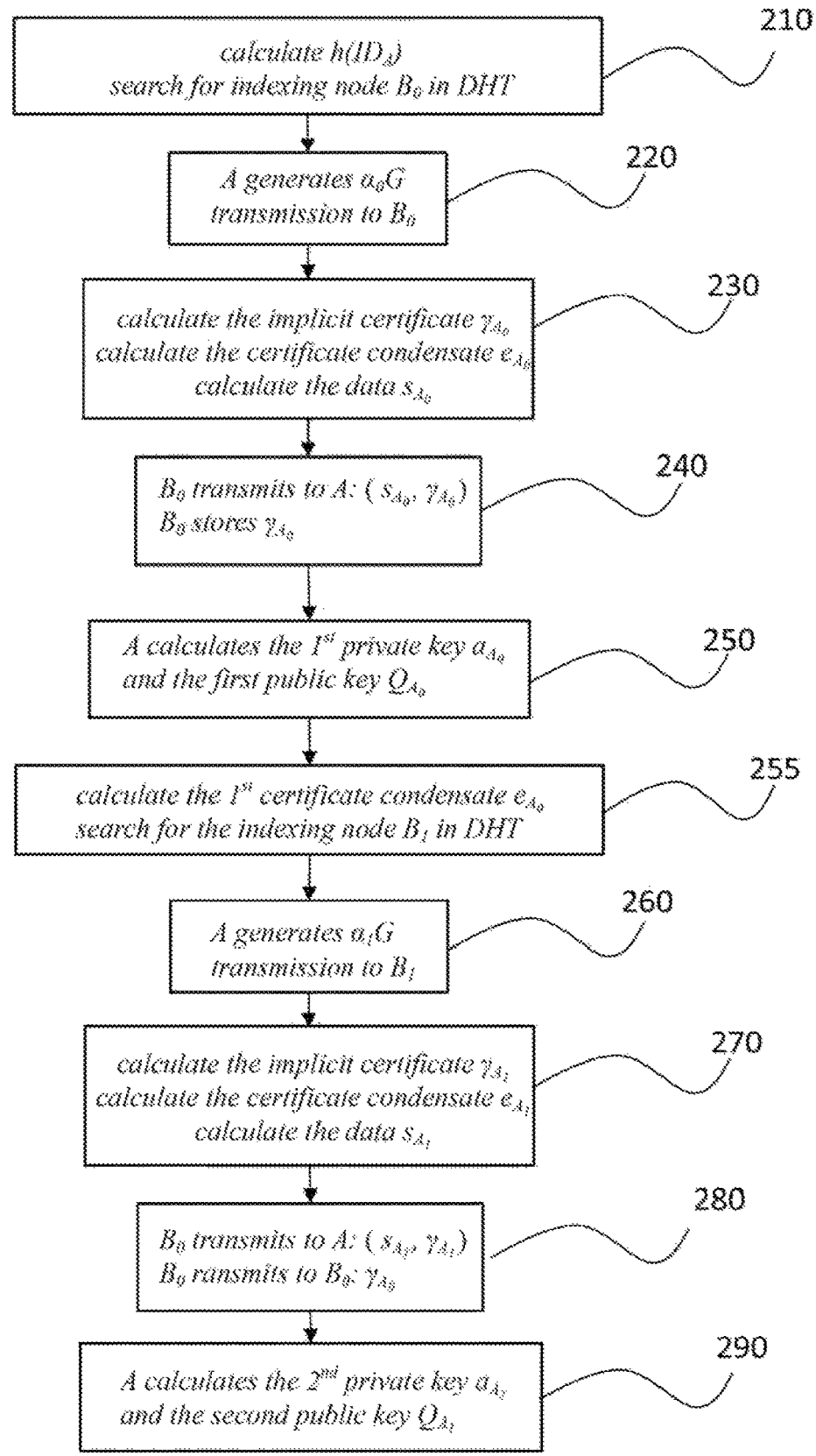
FIG. 2 diagrammatically represents a flowchart of the method of managing public key implicit certificates according to a first embodiment of the invention.

FIG. 2 diagrammatically represents a method or managing implicit certificates according to a first embodiment of the invention;

It is assumed that a node A (Alice) would like to obtain an implicit certificate for a public key using an elliptical curve cryptosystem ECC. The Elliptic Curve Cryptography ECC cryptosystem is defined by a set of given domain parameters, in other words constants involved in the elliptical equation defined on $Z_p$ (in which p is prime), the generating point G and the order n of the cyclic group generated by the generating point.

In step 210, node A calculates the hash value $h(ID_A)$, in which $ID_A$ is a identifier of node A. This is why the value $h(Id_A)$ will be called the identifier condensate. Node A uses the DHT table to determine an indexing node responsible for management of a segment containing $h(ID_A)$. Optionally, a password can be concatenated with the identifier before hashing in all cases, this indexing node is denoted $B_0$.

In step 220, node A generates an integer $\alpha_0$ and sends $\alpha_0 G$ to node $B_0$. In practice, only coordinate $x_0$ of $\alpha_0 G$ can be transmitted, since node $B_0$ knows the domain parameters.

Node $B_0$ has a private key $b_0$ and a corresponding public key $Q_{B_0} = b_0 G$.

In step 230, node $B_0$ calculates private key and public key reconstruction data as follows:

Node $B_0$ generates an integer $k_0$ within the interval [1,n−1] and calculates public key reconstruction data $\gamma_0$ using:

$$\gamma_0 = \alpha_0 G + k_0 G \qquad (4\text{-}1)$$

This public key reconstruction data forms the first implicit certificate (of the public key) for node A.

The indexing node $B_0$ then calculates the condensate $e_{A_0} = h(\gamma_{A_0}||ID_A)$ or the condensate $e_{A_0} = h(\gamma_{A_0}||ID_A||D_{A_0})$ in which $D_{A_0}$ is the validity date of the implicit certificate for the node A and || designates the concatenation operation as above. In any case, the condensate $e_{A_0}$, called the first certificate condensate is obtained by hashing information containing the first implicit certificate $\gamma_{A_0}$ and the node identifier A. Regardless of the form selected for the condensate, node $B_0$ uses it to determine private key reconstruction data:

$$s_{A_0} = e_{A_0} k_{A_0} + b_0 \bmod n \qquad (4\text{-}2)$$

In step 240, the indexing node $B_0$ sends the pair $(s_{A_0}, \gamma_{A_0})$ composed of the private key reconstruction data and the public key reconstruction data to node A. Furthermore, $B_0$ stores the implicit certificate $\gamma_{A_0}$ and possibly the validity date $D_{A_0}$ of this certificate, related to the identifier condensate $h(ID_A)$, in its local memory.

In step 250, node A builds a first private key and a first pubic key using private key and public key reconstruction data respectively, as follows:

$$a_{A_0} = e_{A_0} \alpha_0 + s_{A_0} \bmod n \qquad (5\text{-}1)$$

$$Q_{A_0} = e_{A_0} \gamma_{A_0} + Q_{B_0} \qquad (5\text{-}2)$$

In step 255, an indexing node $B_i$ is generated managing the first implicit certificate in the DHT. More precisely, the node $B_i$ is a DHT indexing node for a segment containing the first certificate condensate, namely $e_{A_0} = h(\gamma_{A_0}||ID_A)$ or one of the variants mentioned above.

In step 260, node generates an integer $\alpha_i$ and sends $\alpha_i G$ to node $B_i$. Node $B_i$ has a private key $b_i$ and a corresponding public key $Q_{B_i} = b_i G$.

In step 270, node $B_i$ calculates private key and public key reconstruction data: More precisely, node $B_i$ generates an integer $k_{B_i}$ within the [1,n−1] interval and calculates public key reconstruction data $\gamma_{A_i}$ using:

$$\gamma_{A_i} = \alpha_i G + k_{B_i} G \qquad (6\text{-}1)$$

This public key reconstruction data forms the second implicit certificate for node A.

The indexing node $B_i$ then calculates a second certificate condensate defined by $e_{A_i} = h(\gamma_{A_i}||ID_A)$ or $e_{A_i} = h(\gamma_{A_i}||ID_A||D_{A_i})$ or, by consolidating certificates $e_{A_i} = h(\gamma_{A_i}||\gamma_{A_0}||ID_A)$ or $e_{A_i} = h(\gamma_{A_i}||\gamma_{A_0}||ID_A||D_{A_i})$ in which $D_i$ is the validity date of the implicit certificate of node $B_i$.

The indexing node $B_i$ determines private key reconstruction data from the second condensate:

$$s_{A_i} = e_{A_i} k_{B_i} + b_i \bmod n \qquad (6\text{-}2)$$

In step 280, the indexing node $B_i$ sends the pair $(s_{A_i}, \gamma_{A_i})$ composed of the private key $s_{A_i}$ reconstruction data and the second implicit certificate, to the indexing node A.

Furthermore, node $B_i$ transmits the second implicit certificate $\gamma_{A_i}$ possibly the validity date $D_{A_i}$ of this certificate to node $B_0$. Node $B_0$ stores the second implicit certificate and possibly the validity date $D_{A_i}$, related to the identifier condensate $h(Id_A)$, in its local memory.

It is thus understood that the first and second implicit certificates $\gamma_{A_0}, \gamma_{A_i}$ and possibly their corresponding validity dates $D_{A_0}, D_{A_i}$, are stored, in relation to $h(Id_A)$.

In step 290, node A constructs a second private key from the private key reconstruction data $s_{A_i}$ and its first private key, $a_{A_0}$, namely:

$$a_{A_i} = a_{A_0} + e_{A_i} \alpha_i + s_{A_i} \bmod n \qquad (7\text{-}1)$$

Similarly, node A constructs a second public key from the public key reconstruction data $\gamma_{A_i}$ and its first public key, $Q_{A_0}$:

$$Q_{A_i} = Q_{A_0} + e_{A_i}\gamma_{A_i} + Q_{B_i} \quad (7\text{-}2)$$

It can be shown that relation $Q_{A_i} = a_{A_i}G$ is actually satisfied.

Figure 3:
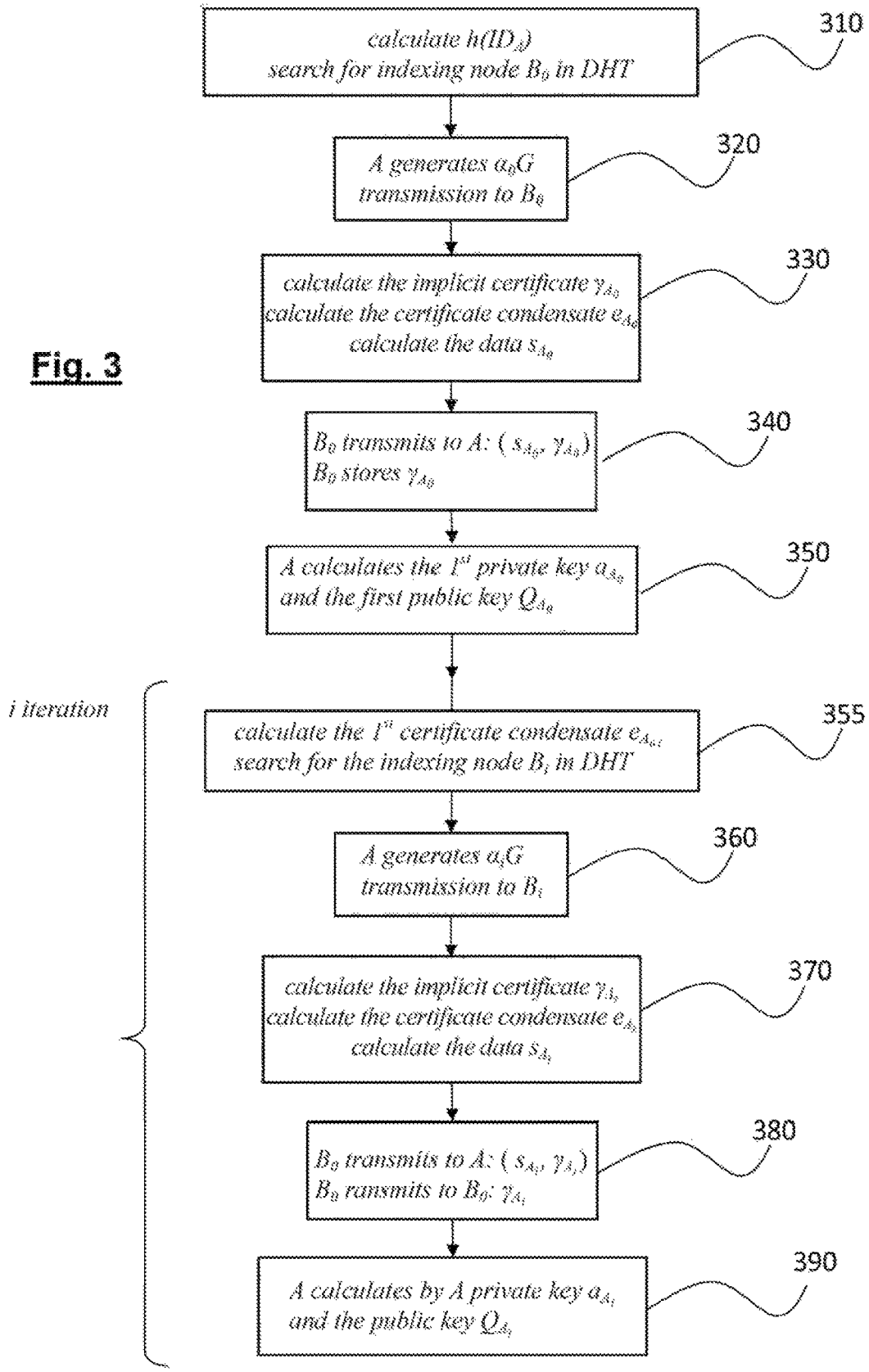
FIG. 3 diagrammatically represents a flowchart of the method of managing public key implicit certificates according to a second embodiment of the invention.

FIG. 3 diagrammatically represents a method of managing implicit certificates according to a second embodiment of this invention;

We will assume that the elliptical curve cryptosystem is the same as in the first embodiment. Node A once again would like to obtain an implicit certificate for a public key related to this cryptosystem.

Generation of the implicit certificate and the keys for node A is initialised by steps 310 to 350. Steps 310 to 350 are identical to steps 210 to 250 respectively and therefore they will not be described again herein.

Some time after the initialisation phase that can correspond to the validity duration of the implicit certificate, or to the expiration of a repetition period, or a duration obtained by a pseudo-random drawer, the implicit certificate is enriched by a recurrence chaining process related to steps 360 to 390. In general, the interval between two successive iterations can be fixed or it can depend on the validity duration of the certificate or it may be pseudo-random.

We will now assume that the $(i-1)^{th}$ iteration has already been done and we will consider the $i^{th}$ iteration.

In step 355, node A searches for node $B_i$ that manages the condensate $e_{A_{i-1}}$ in the DHT, in other words $B_i$ is an indexing node for a segment that contains $e_{A_{i-1}}$.

In step 360, node A generates and integer $\alpha_i$ and sends $\alpha_i G$ to node $B_i$.

Node $B_i$ has a private key $b_i$ and a corresponding public key $Q_{B_i} = b_i G$.

In step 370, node $B_i$ calculates private key and pubic key reconstruction data as follows:

Node $B_i$ generates an integer $k_{B_i}$ within the interval $[1, n-1]$ and calculates pubic key reconstruction data $\gamma_{A_i}$ using:

$$\gamma_{A_i} = \alpha_i G + k_{B_i} G \quad (8\text{-}1)$$

The indexing node $B_i$ calculates the condensate $e_{A_i} = h(\gamma_{A_i} \| ID_A)$ or $e_{A_i} = h(\gamma_{A_i} \| ID_A \| D_{A_i})$ or, by consolidating successive implicit certificates, $e_{A_i} = h(\gamma_{A_i} \| \gamma_{A_{i-1}} \| ID_A)$ or even the condensate $e_{A_i} = h(\gamma_{A_i} \| \gamma_{A_{i-1}} \| ID_A \| D_{A_i})$ in which $D_A$ is the validity date of the implicit certificate of node $B_i$. If required, a trust and reputation ratio (also called the T&R ratio) of node $B_i$ can be added to the operand of the hash function. The T&R ratio is an estimate of the trust and reputation of the node produced from the other nodes in the network. The T&R concept is well established in the domain of P2P (Peer to Peer) communications. In particular, a description of it is given in the paper by A. Medic, entitled "Survey of Computer Trust and Reputation Models—The Literature Overview" published in Int. J. Inf, 2012, vol. 2, no 3. Including the T&R ratio in the operand of the hash function allows other nodes to have more trust in the link between the identifier and the implicit certificate.

Regardless of the form selected far the condensate, node $B_i$ uses it to determine private key reconstruction data for iteration i:

$$s_{A_i} = e_{A_i} k_{B_i} + b_i \bmod n \quad (8\text{-}2)$$

In step 380, the indexing node $B_i$ sends the pair $(s_{A_i}, \gamma_{A_i})$ composed of the private key reconstruction data and the public key reconstruction data for iteration i to node A.

Furthermore, node $B_i$ transmits the implicit certificate $\gamma_{Ai}$ and possibly the validity date $D_{A_i}$ of this certificate to node $B_0$. Node $B_0$ stores the implicit certificate $\gamma_{Ai}$ (and possibly $D_i$ and T & $R_i$, related to the hash value $h(ID_A)$, in its local memory.

In step 390, node A constructs a new private key from the private key reconstruction data for the current iteration i and the private key for the previous iteration, i-1, by:

$$a_{A_i} = a_{A_{i-1}} + e_{A_i}\alpha_i + s_{A_i} \bmod n \quad (9\text{-}1)$$

Similarly, node A constructs a new public key from the public key reconstruction data for iteration i and the public key for iteration i-1:

$$Q_{A_i} = Q_{A_{i-1}} + e_{A_i}\gamma_{A_i} + Q_{B_i} \quad (9\text{-}2)$$

It can be demonstrated by recurrence that $Q_{A_i} = a_{A_i}G$. The property is satisfied for i=0 and if $Q_{A_{i-1}} = a_{A_{i-1}}G$ since by virtue of (9-2) and (8-1) we have:

$$Q_{A_i} = a_{A_{i-1}}G + e_{A_i}(\alpha_i G + k_{B_i} G) + b_i G = (a_{A_{i-1}} + e_{A_i}\alpha_i + e_{A_i}\alpha_i + b_i)G \quad (10)$$

and according to (9-1) and (8-2): $a_{A_i} = a_{A_{i-1}} + e_{A_i}\alpha_i + s_{A_i} = a_{A_{i-1}} + e_{A_i}\alpha_i + e_{A_i}k_{B_i} + b_i$.

It will be noted for a current iteration i, node $B_0$ that manages $h(ID_A)$ in the DHT, stores the list of implicit certificates $\gamma_{A_j}$, j=0, . . . , i, and possibly the list of validity dates $D_{A_j}$ and/or the trust and reputation ratios T & $R_j$, j=0, . . . , i, in its memory in relation to $h(ID_A)$. Node A can simply store its last private key $a_{A_i}$ and its last two implicit certificates $\gamma_{A_i}, \gamma_{A_{i-1}}$, or possibly its last implicit certificate $\gamma_{A_i}$ alone, in its memory.

The last implicit certificate of node A, $\gamma_{A_i}$, is sufficient to update the public key by means of (9-2) provided that the public key of node $Q_{B_i}$ is known. Thus, a node C (Bob) that would like to initiate a secure communication with node A can retrieve the last implicit certificate of node A, $\gamma_{A_i}$ from node $B_0$, managing $h(ID_A)$, and can deduce its current public key $Q_{A_i}$ from it. Conversely, node A must contact the indexing node, $D_0$, managing $h(ID_C)$ in the DHT to retrieve the last implicit certificate of node C and use it to deduce its current public key $Q_{C_i}$. Nodes A and C can then communicate with each other in a secure manner.

Under these conditions, it will be understood that if a "man in the middle" type attack is to be successful, it would have to operate between node A and its indexer, $B_0$, between C and its indexer $D_0$ and between A and C simultaneously, which is very difficult unless the entire network is controlled. Furthermore, each node A and C can check that the public key of the other is coherent by checking if the chaining of implicit certificates is valid. Thus, node C will be able to check that the public key $Q_{A_i}$ is coherent with node A by checking with $B_0$ that is was actually obtained using relation (7-2) from implicit certificates $\gamma_{A_i}, \gamma_{A_{i-1}}, \ldots, \gamma_{A_0}$.

Therefore according to this invention, the certificates are not stored with a single certification authority but instead with indexing nodes participating in the DHT.

Distributed storage of implicit certificates and chaining of these certificates to obtain pubic and private keys of nodes make the network particularly resistant to "man in the middle" type attacks.

The invention claimed is:

1. A method of managing implicit certificates of public keys for a communication network, the public keys being related to an elliptic curve cryptosystem, each implicit certificate being usable to identify a public key of a node on the network and each node being identified by an identifier, wherein:

a first implicit certificate ($\gamma_{A_j}$) of a node A is calculated by and is stored in a first indexing node ($B_0$), the first indexing node being determined by a distributed hash table, starting from an identifier condensate obtained by hashing a first value containing the node identifier A;

a first public key ($Q_{A_0}$) of node A is calculated from the first implicit certificate and the public key of the first indexing node ($Q_{B_0}$);

a second implicit certificate ($\gamma_{A_i}$) of node A is calculated by a second indexing node ($B_i$), the second indexing node being determined by said distributed hash table from a first certificate condensate ($e_{A_0}$) obtained by hashing a second value containing the first implicit certificate and the node identifier A, said second implicit certificate being transmitted to the first indexing node to be stored in it;

a second public key ($Q_{A_i}$) of node A is calculated from the first public key ($Q_{A_0}$) of node A and the public key of the second indexing node ($Q_{B_i}$).

2. The method of managing implicit certificates according to claim 1, in which the identifier condensate is obtained by $h(ID_A\|keyword)$ where $ID_A$ is the identifier of node A, keyword is a known password of network nodes, $\|$ is a concatenation operation and h is a hash function.

3. The method of managing implicit certificates according to claim 1, wherein:

the first public key of node A is calculated by $Q_{A_0}=e_{A_0}\gamma_{A_0}+Q_{B_0}$ in which $\gamma_{A_0}$ is the first implicit certificate, $e_{A_0}$ is the first certificate condensate and $Q_{B_0}$ is the public key of the first indexing node;

the second public key of node A is calculated by $Q_{A_i}=Q_{A_0}+e_{A_i}\gamma_{A_i}+Q_{B_i}$ in which $\gamma_{A_i}$ is the second implicit certificate of node A, $e_{A_i}$ is a second certificate condensate obtained by hashing a second value, containing the second implicit certificate of node A, and $Q_{B_i}$ is the public key of the second indexing node.

4. The method of managing implicit certificates according to claim 1, wherein a plurality of implicit certificates are generated for node A during a plurality of successive iterations, and in that at iteration i:1 an $(i+1)^{th}$ indexing node ($B_i$) calculates a $(i+1)^{th}$ implicit certificate ($\gamma_{A_i}$) for node A, the $(i+1)^{th}$ indexing node being determined by the distributed hash table from a $i^{th}$ certificate condensate ($e_{A_{i-1}}$) obtained by hashing a $(i+1)^{th}$ value containing the $i^{th}$ implicit certificate of node A obtained in the previous iteration, and the identifier of node A ($ID_A$), said $(i+1)^{th}$ implicit certificate of node A being transmitted to the first indexing node to be stored in it;

an $(i+1)^{th}$ public key ($Q_{A_i}$) of node A is calculated from the $i^{th}$ public key ($Q_{A_{i-1}}$) of node A, obtained in the previous iteration, and the public key of the $(i+1)^{th}$ indexing node ($Q_{B_i}$).

5. The method of managing implicit certificates according to claim 4, wherein the $(i+1)^{th}$ certificate condensate is obtained by $e_{A_i}=h(\gamma_{A_i}\|ID_A)$ or $e_{A_i}=h(\gamma_{A_i}\|\gamma_{A_{i-1}}\|ID_A)$ in which $\gamma_{A_i}$ and $\gamma_{A_{i-1}}$ are the $(i+1)^{th}$ and $i^{th}$ implicit certificates respectively, $ID_A$ is the node identifier A and $\|$ is a concatenation operation and h is a hash function.

6. The method of managing implicit certificates according to claim 4, wherein the $(i+1)$ certificate condensate is obtained by $e_{A_i}=h(\gamma_{A_i}\|ID_A\|D_A)$ or $e_{A_i}=h(\gamma_{A_i}\|\gamma_{A_{i-1}}\|ID_A\|D_{A_i})$ in which $\gamma_{A_i}$ and $\gamma_{A_{i-1}}$ are the $(i+1)^{th}$ and $i^{th}$ implicit certificates, $ID_A$ is the node identifier A, $D_{A_i}$ is a validity date associated with the $(i+1)^{th}$ implicit certificate, $\|$ is a concatenation operation and h is a hash function.

7. The method of managing implicit certificates according to claim 4, wherein the $(i+1)^{th}$ public key of node A is calculated by $Q_{A_i}=Q_{A_{i-1}}+e_{A_i}\gamma_{A_i}+Q_{B_i}$ in which $\gamma_{A_i}$ is the $(i+1)^{th}$ implicit certificate of node A, $e_{A_i}$ is the $(i+1)^{th}$ certificate condensate and $Q_{B_i}$ is the public key of the $(i+1)^{th}$ indexing node.

8. The method of managing implicit certificates according to claim 4, wherein the interval between two successive iterations has a predetermined fixed duration.

9. The method of managing implicit certificates according to claim 4, wherein the $(i+1)^{th}$ implicit certificate ($\gamma_{A_i}$) calculated in iteration i, is associated with a validity date ($D_{A_i}$) and in that the next iteration is made when said validity date has expired.

10. The method of managing implicit certificates according to claim 4, wherein the interval between successive iterations has a pseudo-random duration.

11. The method of managing implicit certificates according to claim 4, wherein, in iteration i, the first indexing node stores a list of implicit certificates $\gamma_{A_j}$, j=0, . . . , i obtained during successive iterations, in relation to the identifier condensate.

12. The method of managing implicit certificates according to claim 11, wherein, in iteration i, the first indexing node stores a list of validity dates $D_{A_j}$, j=0, . . . , i of said implicit certificates and/or a list of trust and reputation ratios $T\ \&\ R_j$, j=0, . . . , i in relation to the identifier condensate, in which $T\ \&\ R_j$ is the trust and reputation ratio of the $(j+1)^{th}$ indexing node.

* * * * *